United States Patent
Rady et al.

(10) Patent No.: US 11,652,684 B1
(45) Date of Patent: May 16, 2023

(54) SYSTEM, METHOD, DEVICE, AND PROGRAM FOR PERFORMING AUTOMATIC TROUBLESHOOTING OF A NETWORK

(71) Applicant: Rakuten Mobile, Inc., Tokyo (JP)

(72) Inventors: Moataz Rady, Tokyo (JP); Ahmed Abdelaziz, Tokyo (JP); Mohammed Kamel, Tokyo (JP); Ziya Akhundov, Tokyo (JP); Trevor Wieland, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 0 days.

(21) Appl. No.: 17/455,307

(22) Filed: Nov. 17, 2021

(51) Int. Cl.
*H04L 41/0654* (2022.01)
*H04L 43/022* (2022.01)
*H04L 41/0604* (2022.01)
*H04L 41/5009* (2022.01)

(52) U.S. Cl.
CPC ...... *H04L 41/0654* (2013.01); *H04L 41/0604* (2013.01); *H04L 41/5009* (2013.01); *H04L 43/022* (2013.01)

(58) Field of Classification Search
CPC ............ H04L 41/0654; H04L 41/0604; H04L 41/5009; H04L 43/022
See application file for complete search history.

(56) References Cited

U.S. PATENT DOCUMENTS

| | | | |
|---|---|---|---|
| 2012/0144226 A1* | 6/2012 | Yang | H04L 41/0672 714/E11.029 |
| 2015/0304191 A1 | 10/2015 | Groenendijk et al. | |
| 2017/0126476 A1* | 5/2017 | Curtin | H04L 41/0631 |
| 2017/0180190 A1* | 6/2017 | Kubinszky | H04L 41/0659 |
| 2017/0207948 A1* | 7/2017 | Ratakonda | H04L 43/18 |
| 2018/0268291 A1* | 9/2018 | Turner | G06N 3/088 |
| 2020/0028782 A1* | 1/2020 | Li | H04L 47/12 |

(Continued)

OTHER PUBLICATIONS

Gömez-Andrades et al., "Methodology for the Design and Evaluation of Self-Healing LTE Networks", IEEE Transactions on Vehicular Technology, vol. 65, No. 8, pp. 6468-6486, Aug. 2016 (19 pages total).

(Continued)

*Primary Examiner* — Brian Whipple
*Assistant Examiner* — James Ross Hollister
(74) *Attorney, Agent, or Firm* — Sughrue Mion, PLLC

(57) ABSTRACT

A method of automatic troubleshooting, includes determining that a first parameter was degraded; identifying at least one first process corresponding to the first parameter; determining whether the at least one first process was operating while the first parameter was degraded; based on determining that the at least one first process was operating while the first parameter was degraded, identifying a problem scenario corresponding to the first parameter and the at least one first process; identifying a plurality of second parameters associated with the problem scenario; determining whether the plurality of second parameters were degraded; based on determining that the plurality of second parameters were degraded, determining that the problem scenario occurred; and based on determining that the problem scenario occurred, displaying information indicating the problem scenario.

19 Claims, 9 Drawing Sheets

(56) References Cited

U.S. PATENT DOCUMENTS

2021/0136098 A1\* 5/2021 Stergioudis ............ G06N 20/20
2021/0226841 A1\* 7/2021 Liu ..................... H04L 41/0695

OTHER PUBLICATIONS

International Search Report dated May 31, 2022 from the International Searching Authority in International Application No. PCT/US2022/016068.
Written Opinion dated May 31, 2022 from the International Searching Authority in International Application No. PCT/US2022/016068.

\* cited by examiner

| No | Time | Source | Destination | | Protocol | Length | AVP ( | AVP |
|---|---|---|---|---|---|---|---|---|
| 16 | 2021-03-10 13:08:25.217573 | | | | GTPv2 | 177 | | |
| 17 | 2021-03-10 13:08:25.221104 | | | | GTPv2 | 805 | | |
| 18 | 2021-03-10 13:08:25.221905 | | | 01:2807:... | DIAME... | 462 | 26... | 26... |
| 19 | 2021-03-10 13:08:25.223712 | | | 01:28b4:... | DIAME... | 584 | 26... | 26... |
| 20 | 2021-03-10 13:08:25.227888 | | | 01:2808:... | DIAME... | 1514 | 26... | 26... |
| 21 | 2021-03-10 13:08:25.228823 | | | 02:2003:... | DIAME... | 442 | 26... | 26... |
| 22 | 2021-03-10 13:08:25.234637 | | | 97 | GTPv2 | 68 | | |
| 23 | 2021-03-10 13:08:25.235378 | | | 4390 | RRC | 185 | | |
| 24 | 2021-03-10 13:08:25.236378 | | | 02:544b:... | VSE | 196 | | |
| 25 | 2021-03-10 13:08:25.236378 | | | 02:544b:... | VSE | 197 | | |
| 26 | 2021-03-10 13:08:25.371821 | | | 01:2002:... | S1AP/... | 194 | | |
| 27 | 2021-03-10 13:08:25.371821 | | | 01:2002:... | SCTP | 194 | | |
| 28 | 2021-03-10 13:08:25.398017 | | | 97 | GTPv2 | 177 | | |
| 29 | 2021-03-10 13:08:25.401011 | | | | GTPv2 | 805 | | |
| 30 | 2021-03-10 13:08:25.401817 | | | 01:288c:... | DIAME... | 478 | 26... | 26... |
| 31 | 2021-03-10 13:08:25.401839 | | | 01:288c:... | SCTP | 478 | | |
| 32 | 2021-03-10 13:08:25.403168 | | | 01:2840:... | DIAME... | 594 | 26... | 26... |

> Flags: 0x48
  010. .... = Version: 2
  ...0 .... = Piggybacking flag (P): 0
  .... 1... = TEID flag (T): 1
  .... .0.. = Message Priority(MP): 0
Message Type: Context Acknowledge (132)
Message Length: 14
Tunnel Endpoint Identifier: 0x4c35df6d (1278509921)
Sequence Number: 0x64e145 (6611269)
Spare: 0
> Cause : No resources available (73)
  IE Type: Cause (2)

(A)

600

SYSTEM, METHOD, DEVICE, AND PROGRAM FOR PERFORMING AUTOMATIC TROUBLESHOOTING OF A NETWORK

BACKGROUND

Troubleshooting processes in the telecommunication industry are generally time consuming. For example, many processes for troubleshooting are not automated, and require individual assessment of issues as they arise. In addition, it is often difficult to identify issues in edge cases or corner cases in which unexpected behavior happens.

SUMMARY

According to embodiments, a method of automatic troubleshooting, includes determining that a first parameter was degraded; identifying at least one first process corresponding to the first parameter; determining whether the at least one first process was operating while the first parameter was degraded; based on determining that the at least one first process was operating while the first parameter was degraded, identifying a problem scenario corresponding to the first parameter and the at least one first process; identifying a plurality of second parameters associated with the problem scenario; determining whether the plurality of second parameters were degraded; based on determining that the plurality of second parameters were degraded, determining that the problem scenario occurred; and based on determining that the problem scenario occurred, displaying information indicating the problem scenario.

The method may include, based on determining that the at least one first process was not operating while the first parameter was degraded, determining that an unknown problem scenario occurred; and based on determining that the unknown problem scenario occurred, displaying information indicating that the first parameter was degraded and that the at least one first process was not operating while the first parameter was degraded.

The method may include, based on determining that the unknown problem scenario occurred, identifying at least one second process that was operating while the first parameter was degraded; identifying at least one third parameter that was degraded while the first parameter was degraded; and storing information identifying a new problem scenario associated with the first parameter, the at least one second process, and the at least one third parameter.

The method may include, based on determining that at least one second parameter of the plurality of second parameters was not degraded, determining that an unknown problem scenario occurred; and based on determining that the unknown problem scenario is present, displaying information indicating that the first parameter was degraded, that the at least one first process was operating while the first parameter was degraded, and that the at least one second parameter was not degraded.

The method may include, based on determining that the unknown problem scenario occurred, identifying at least one third parameter that was degraded while the first parameter was degraded; and storing information identifying a new problem scenario associated with the first parameter, the at least one first process, and the at least one third parameter.

The problem scenario may relate to a network malfunction of a network.

The first parameter may relate to at least one from among a network alarm, a node alarm, a link alarm, or key performance indicator associated with the network.

The information indicating the problem scenario may include information identifying the network malfunction and a sample signaling trace captured based on the network malfunction.

The sample signaling trace may indicate a plurality of key performance indicators corresponding to the network malfunction.

According to embodiments, a device for automatic troubleshooting includes a memory configured to store instructions; and one or more processors configured to execute the instructions to: determine that a first parameter was degraded; identify at least one first process corresponding to the first parameter; determine whether the at least one first process was operating while the first parameter was degraded; based on determining that the at least one first process was operating while the first parameter was degraded, identify a problem scenario corresponding to the first parameter and the at least one first process; identify a plurality of second parameters associated with the problem scenario; determine whether the plurality of second parameters were degraded; based on determining that the plurality of second parameters were degraded, determine that the problem scenario occurred; and based on determining that the problem scenario occurred, display information indicating the problem scenario.

The one or more processors may be further configured to execute the instructions to: based on determining that the at least one first process was not operating while the first parameter was degraded, determine that an unknown problem scenario occurred; and based on determining that the unknown problem scenario occurred, display information indicating that the first parameter was degraded and that the at least one first process was not operating while the first parameter was degraded.

The one or more processors may be further configured to execute the instructions to: based on determining that the unknown problem scenario occurred, identify at least one second process that was operating while the first parameter was degraded; identify at least one third parameter that was degraded while the first parameter was degraded; and store information identifying a new problem scenario associated with the first parameter, the at least one second process, and the at least one third parameter.

The one or more processors may be further configured to execute the instructions to: based on determining that at least one second parameter of the plurality of second parameters was not degraded, determine that an unknown problem scenario occurred; and based on determining that the unknown problem scenario is present, display information indicating that the first parameter was degraded, that the at least one first process was operating while the first parameter was degraded, and that the at least one second parameter was not degraded.

The one or more processors may be further configured to execute the instructions to: based on determining that the unknown problem scenario occurred, identify at least one third parameter that was degraded while the first parameter was degraded; and store information identifying a new problem scenario associated with the first parameter, the at least one first process, and the at least one third parameter.

The problem scenario may relate to a network malfunction of a network.

The first parameter may relate to at least one from among a network alarm, a node alarm, a link alarm, or key performance indicator associated with the network.

The information indicating the problem scenario may include information identifying the network malfunction and a sample signaling trace captured based on the network malfunction.

The sample signaling trace may indicate a plurality of key performance indicators corresponding to the network malfunction.

According to embodiments, a non-transitory computer-readable medium stores instructions including: one or more instructions that, when executed by one or more processors of a device for automatic troubleshooting, cause the one or more processors to: determine that a first parameter was degraded; identify at least one first process corresponding to the first parameter; determine whether the at least one first process was operating while the first parameter was degraded; based on determining that the at least one first process was operating while the first parameter was degraded, identify a problem scenario corresponding to the first parameter and the at least one first process; identify a plurality of second parameters associated with the problem scenario; determine whether the plurality of second parameters were degraded; based on determining that the plurality of second parameters were degraded, determine that the problem scenario occurred; and based on determining that the problem scenario occurred, display information indicating the problem scenario.

The problem scenario may relate to a network malfunction of a network.

BRIEF DESCRIPTION OF THE DRAWINGS

Features, advantages, and significance of exemplary embodiments of the disclosure will be described below with reference to the accompanying drawings, in which like signs denote like elements, and wherein:

FIGS. 6A-6B illustrate a diagram of an example user interface of a network management system, according to embodiments;

DETAILED DESCRIPTION

Figure 1:
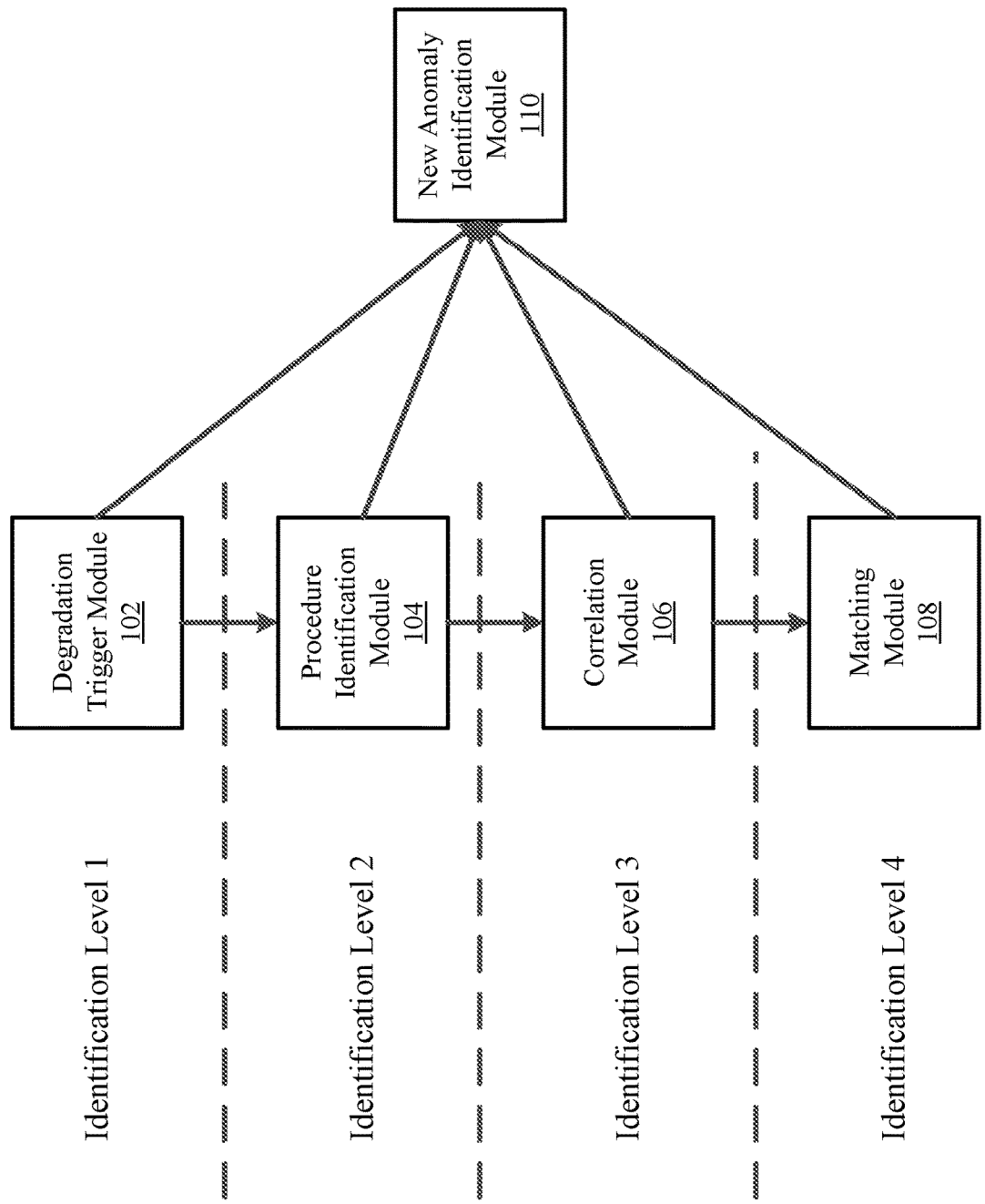
FIG. 1 is a diagram of a network management and troubleshooting system, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

Embodiments may relate to troubleshooting as an adaptive code, where a troubleshooting methodology may be represented as a flowchart, and then we converted it into a code. By doing so, automated or automatic root cause analysis (RCA) may be quickly performed for any problematic scenario, and severe extended network incidents may be avoided. The automated process, performed for example by one or more processors of a an element attached to associated with a network, may be used to analyze possible problematic scenarios for particular key performance indicators (KPIs), and the process can demonstrate adaptability by identifying any new network anomaly and create a new code for it. This may lead to, for example, autonomous network functionality.

Accordingly, embodiments may provide:

Speed, where the elements implementing the process may be able to quickly auto-RCA for a network's problematic scenarios.

Adaptability, where the elements implementing the process will be able to automatically identify any new abnormal scenario and add it to a hierarchized troubleshooting methodology, which may be automatically converted into code.

Analytics, where an investigation of certain KPIs may be requested, and the elements implementing the process may investigate and provide feedback with the most applicable problematic scenario(s) related to the KPI under investigation, and also provide for example a correlation percentage between the KPI and the potential problematic scenarios.

As discussed above, troubleshooting in telecommunication industry is time consuming, especially for edge cases and corner cases where unexpected behavior happens. Using embodiments described herein, an RCA analysis may be automated and hence much faster and more accurate. Also, the risk of an extended or long-term incident may be reduced, as embodiments may perform the analysis much more quickly than traditional related-art troubleshooting procedures. Embodiments may allow human involvement to be reduced by providing an adaptability capability where the elements implementing the process may be able to identify any new problematic scenario and add a new code for it. In addition, embodiments may provide an analytics capability, where we can identify network's problems and work on it for improvement without human intervention. By doing so, operation cost in the telecommunication industry may be reduced and auto-healing functionality may be provided. Accordingly, embodiments may provide troubleshooting as an adaptive code. In addition, embodiments may provide faster troubleshooting, operating expenses (opex) cost reduction, major incident avoidance, and increased customer satisfaction.

FIG. 1 is a diagram of an overview of an embodiment described herein. As shown in FIG. 1, a network management and troubleshooting process 100 may proceed according to one or more identification levels, for example identification level 1, identification level 2, identification level 3, and identification level 4. In embodiments, network management and troubleshooting process 100 may correspond to a troubleshooting method of procedure (T-MOP).

As shown in FIG. 1, identification level 1 may correspond to, or be implemented using, degradation trigger module 102. Degradation trigger module 102 may be, for example, an engine or monitor which monitors network conditions, and may automatically trigger by identifying an issue such as a degradation or deviation associated with one or more fields of interest. The one or more fields of interest may include, for example, a network alarm, a node alarm, a link alarm, or a KPI, for example a KPI under investigation. Degradation trigger module 102 may be triggered based on one field of interest at a time, or may be triggered based on several fields of interest at the same time. Identification level 1 may be accomplished when degradation trigger module 102 is triggered.

As shown in FIG. 1, identification level 2 may correspond to, or be implemented using, procedure identification module 104. After identification level 1 is accomplished, procedure identification module 104 may identify problematic procedures corresponding to the identified issue that triggered degradation trigger module 102. Identification level 2 may be accomplished when a problematic procedure is identified.

As shown in FIG. 1, identification level 3 may correspond to, or be implemented using, correlation module 106. After identification level 2 is accomplished, correlation module 106 may automatically identify other potential issues corresponding to one or more of the problematic procedure identified by procedure identification module 104 and the identified issue that triggered degradation trigger module 102. Identification level 3 may be accomplished when one or more correlated potential issues are identified.

As shown in FIG. 1, identification level 4 may correspond to, or be implemented using, matching module 108. Matching module 108 may create a matching hierarchy for the potential problematic scenarios. Matching module 108 may determine a problematic scenario that may have cause the identified issue based on previously-stored information and information collected by degradation trigger module 102, procedure identification module 104, and correlation module 106. For example, the previously-stored information may indicated that, when the identified issue is present along with the problematic procedures and the other potential issues, a particular problematic scenario is a potential root cause of the identified issue.

As shown in FIG. 1, any of the identification levels or modules of network management and troubleshooting process 100 may proceed at any time to new anomaly identification module 110. In embodiments, new anomaly identification module 110 may be notified or activated if degradation trigger module 102 detects an unidentified issue, or an issue that has not been previously associated with a problematic scenario. In embodiments, new anomaly identification module 110 may be notified or activated if procedure identification module 104 is unable to identify a problematic procedure corresponding to the identified issue. In embodiments, new anomaly identification module 110 may be notified or activated if correlation module 106 is unable to identify other potential issues, or if matching module 108 is unable to match the information with previously-stored information, or is otherwise unable to identify a problematic scenario corresponding to the identified issue. In embodiments, new anomaly identification module 110 may be notified or activated if any unexpected event occurs during any part of network management and troubleshooting process 100.

In these or other situations, new anomaly identification module 110 may collect information related to the identified issue and problematic procedures corresponding to the identified issue. In addition, after a new problematic scenario is determined to correspond to the identified issue, new anomaly identification module 110 may create a matching point for the new problematic scenario, and may generate code corresponding to the new problematic scenario which may be used by degradation trigger module 102, procedure identification module 104, correlation module 106, or matching module 108 to identify the new problematic scenario. For example, the code generated by new anomaly identification module 110 may be added to the previously-stored information used by matching module 108. In embodiments, network management and troubleshooting process 100 may also include additional modules which may assist in identifying new problematic scenarios.

Figure 2:
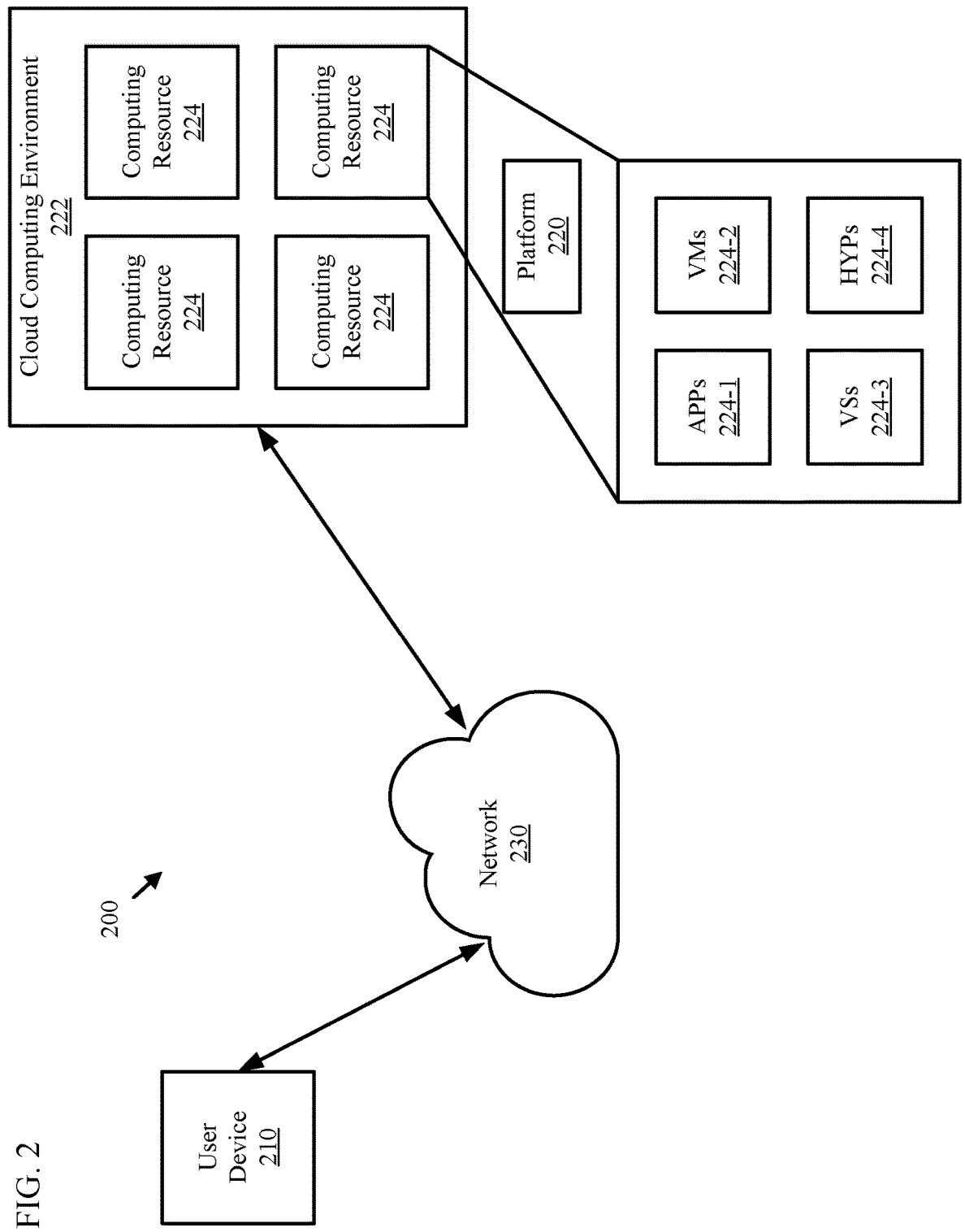
FIG. 2 is a diagram of an example environment in which systems and/or methods, described herein, may be implemented, according to embodiments.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions of the elements included in network management system 100 may be performed by any combination of elements illustrated in FIG. 2. For example, in embodiments, user device 210 may perform one or more functions associated with user device 106, and platform 220 may perform one or more functions associated with any of degradation trigger module 102, procedure identification module 104, correlation module 106, matching module 108, or new anomaly identification module 110.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of determining a heart rate of a subject using RPPG, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
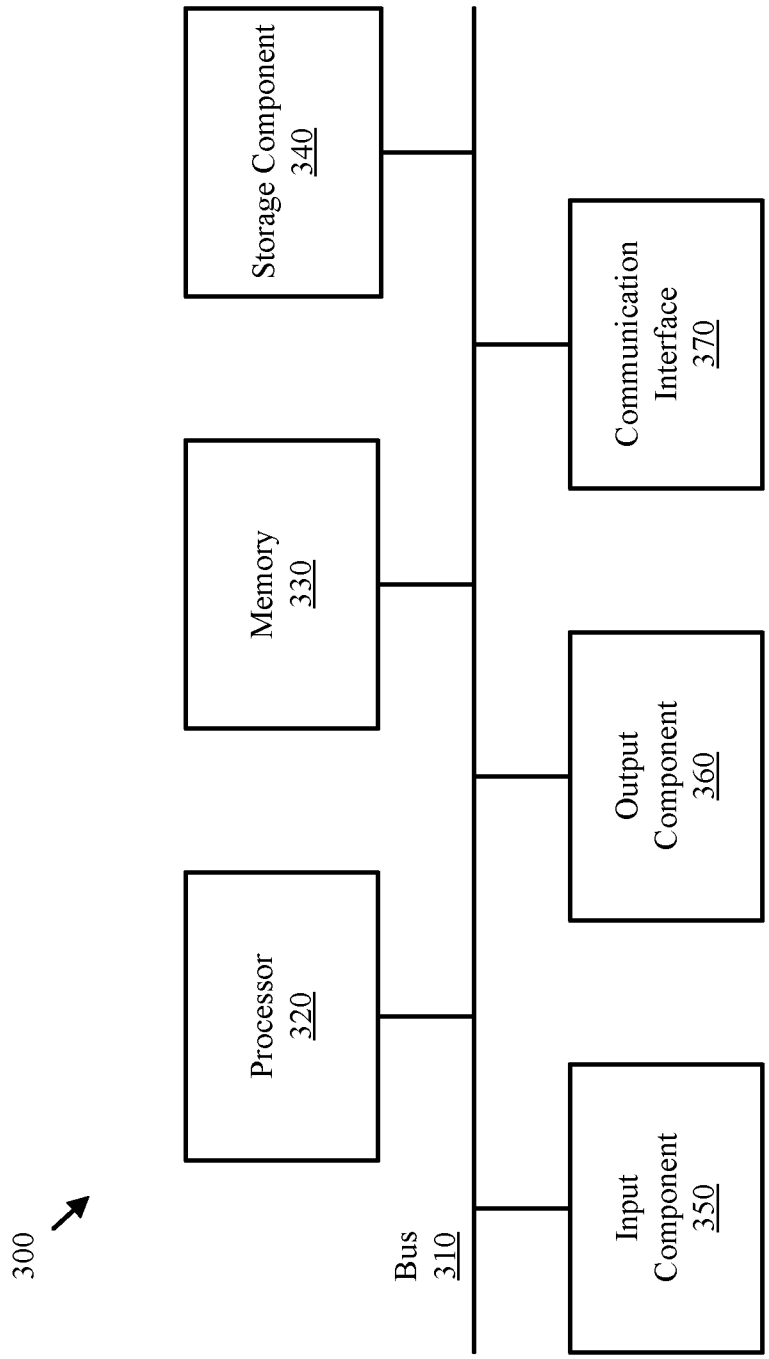
FIG. 3 is a diagram of example components of one or more devices of FIG. 2, according to embodiments.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the modules or identification levels of FIG. 1 may be implemented by or using any one of the elements illustrated in FIGS. 2-3. For example any or one or more of degradation trigger module 102, procedure identification module 104, correlation module 106, matching module 108, or new anomaly identification module 110 may be implemented by or correspond to any one or more of user device 210, platform 220, computing resource 224, or one or more components of device 300.

Figure 4A:
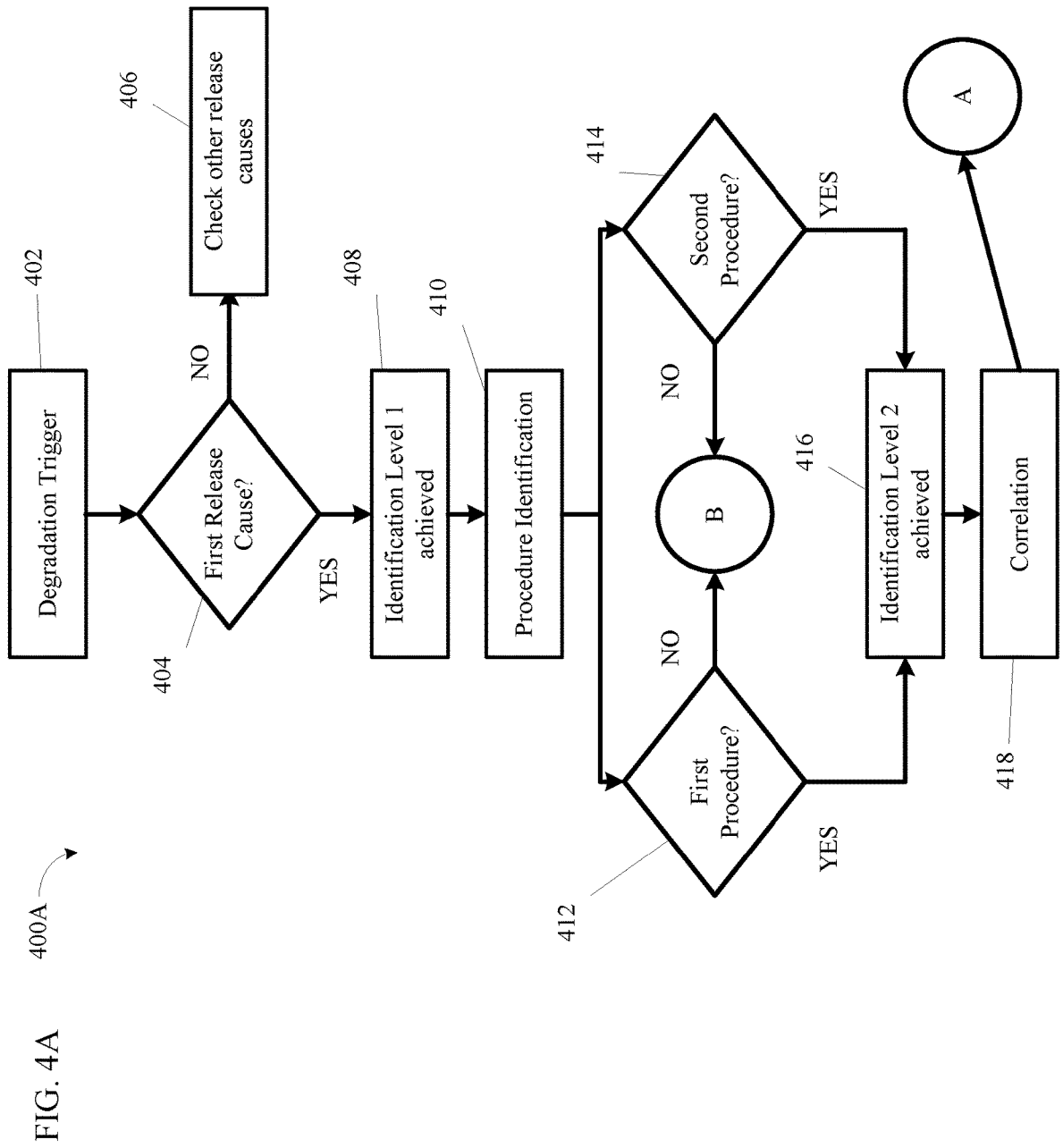
FIGS. 4A-4B are flow charts of example processes for network management and troubleshooting, according to embodiments.
Figure 4B:
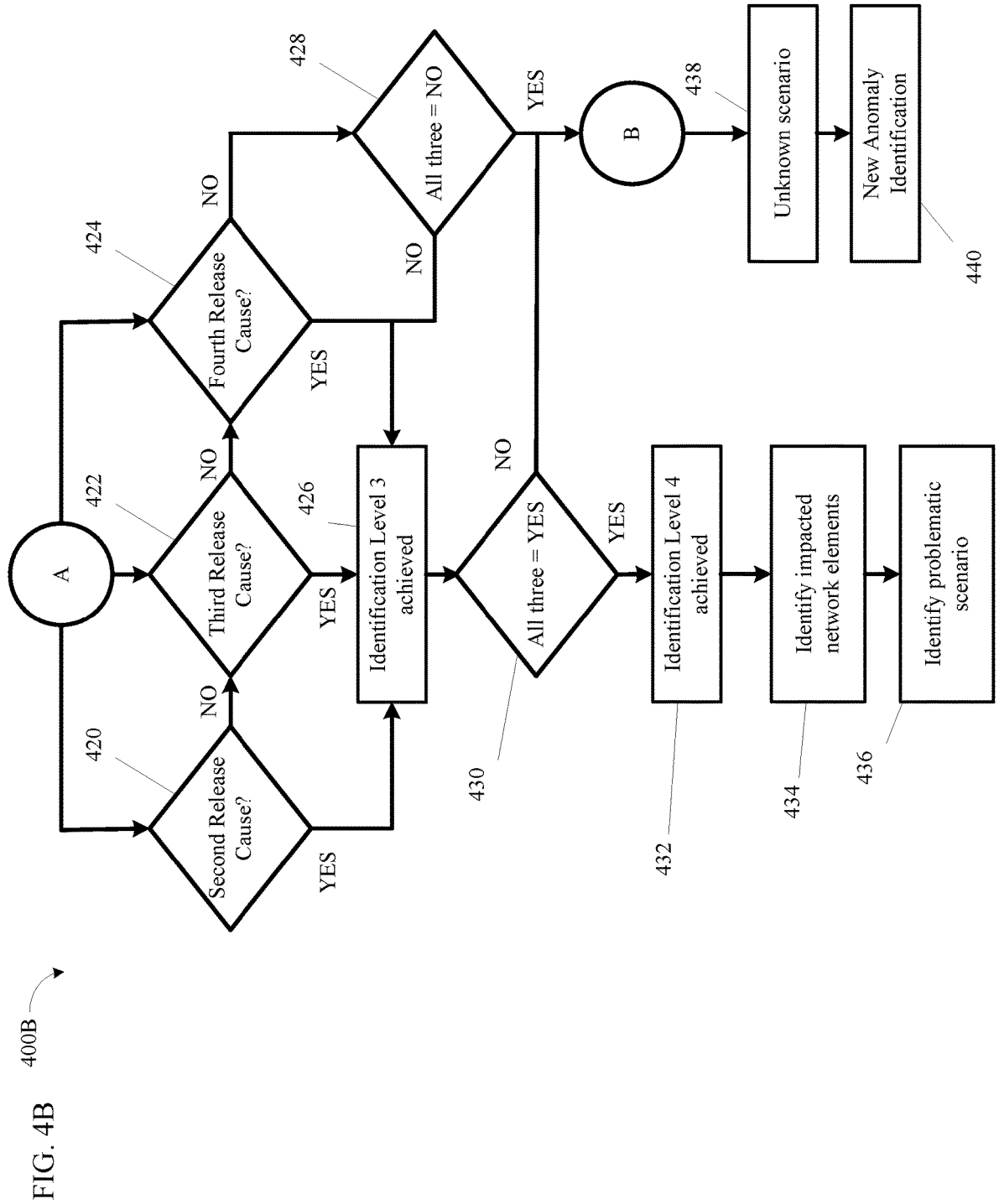

FIGS. 4A-4B are flow charts of example processes 400A-400B for network management and troubleshooting. As illustrated in FIGS. 4A-4B, one or more process blocks of processes 400A-400B may be performed by any of the elements of FIGS. 1-3 discussed above. As illustrated in FIGS. 4A-4B, one or more process blocks of processes 400A-400B may correspond to network management and troubleshooting process 100. In embodiments, one or more process blocks of processes 400A-400B may be performed by or using elements illustrated in FIG. 1, for example any or one or more of degradation trigger module 102, procedure identification module 104, correlation module 106, matching module 108, or new anomaly identification module 110. In some implementations, one or more process blocks of processes 400A-400B may be performed by or using elements illustrated in FIGS. 2-3, for example any one or more of user device 210, platform 220, computing resource 224, or components of device 300.

Processes 400A-400B may represent one process flow out of many process flow. The process flow illustrated in processes 400A-400B that may be used to identify one particular problematic scenario out of many previously-identified problematic scenarios. For example, processes 400A-400B may be represented as code that is stored as part of the previously-stored information, and that is used by modules of FIG. 1 to identify a particular problematic scenario. In this way, processes 400A-400B may form a part of a learning background for a T-MOP.

As shown in FIG. 4A, process 400A may include detecting a degradation trigger at operation 402. In embodiments, the degradation trigger may be detected by degradation trigger module 102 as discussed above.

As further shown in FIG. 4A, process 400A may include determining whether the degradation trigger corresponds to a first release cause at operation 404. In embodiments, a release cause may be a code used to identify an event such as a degradation. If the degradation trigger is determined to correspond to the first release cause (YES at operation 404), then identification level 1 may be achieved or accomplished at operation 408. If the degradation trigger is determined not to correspond to the first release cause (NO at operation 404), then other release causes may be investigated at operation 406.

As further shown in FIG. 4A, process 400A may include performing procedure identification to identify problematic procedures associated with the first release cause at operation 410. In embodiments, the procedure identification may be performed by procedure identification module 104 as discussed above. In embodiments, the procedure identification may identify a first procedure and a second procedure that may be associated with the first release cause.

As further shown in FIG. 4A, process 400A may include determining whether a first procedure was operating at a time corresponding to the first release cause at operation 412, and determining whether a second procedure was operating at a time corresponding to the first release cause at operation 414. If both of the first procedure and the second procedure are determined to be operating at a time corresponding to the first release cause (YES at operations 412 and 414), then identification level 2 may be achieved or accomplished at operation 416. If one or more of the first procedure and the second procedure are determined not to be operating at a time corresponding to the first release cause (NO at one of operations 412 and 414), then it may be determined that an unknown scenario is present at operation 438 of process 400B. In embodiments, operations 412, 414, and 416 may be performed by procedure identification module 104 as discussed above.

As shown in FIG. 4A, after identification level 2 is achieved, process 400A may include performing correlation at operation 418, and proceed to process 400B. In embodiments, the correlation may be performed by correlation module 106 as discussed above.

As shown in FIG. 4B, process 400B may include determining whether other potential release causes are also present, for example second release cause at operation 420, third release cause at operation 422, and fourth release cause at operation 424.

If one or more of the second release cause, third release cause, and fourth release cause are determined to be present (YES at any one of operations 420, 422, and 424), then identification level 3 may be achieved or accomplished at operation 426. If none of the second release cause, third release cause, and fourth release cause are determined to be present (NO at all one of operations 420, 422, and 424), then it may be determined that an unknown scenario is present at operation 438 of process 400B. In embodiments, operations 420, 422, 424, and 426 may be performed by procedure correlation module 106 as discussed above.

As shown in FIG. 4B, after identification level 3 is achieved, process 400B may include determining whether all three of the second release cause, third release cause, and fourth release cause are present.

If all three of all three of the second release cause, third release cause, and fourth release cause are present (YES at operation 430), then identification level 4 may be achieved or accomplished at operation 432. If one or more of the second release cause, third release cause, and fourth release cause are not present (NO at operation 430), then it may be determined that an unknown scenario is present at operation 438 of process 400B.

As shown in FIG. 4B, after identification level 4 is achieved, process 400B may include identifying impacted network elements at operation 434, and identifying the problematic scenario that is present at operation 436. In embodiments, operations 430, 432, 434, and 436 may be performed by matching module 108 as discussed above.

In embodiments, any of the information discussed above, including the results associated with identification levels 1-4, the impacted network elements, and the identified problematic scenario may be collected and transmitted to another device or system, and/or provided to or displayed for a user. In addition, any of the information discussed above may be used to refine the stored information, or to generate new information such as identification processes for new problematic scenarios, or new identification processes for previously-encountered problematic scenarios.

As shown in FIG. 4B, after an unknown scenario is determined to be present at operation 438, process 400B may include new anomaly identification at operation 440. For example, a new problematic scenario may be identified and matched with one or more release causes and problematic procedures. In embodiments, a new process flow different from processes 400A-400B may be automatically generated to allow identification of the new problematic scenario in the future. In embodiments, code may be generated to represent the new process flor, and the code may be stored for future use. In embodiments, operation 440 may be performed by new anomaly identification module 110 as discussed above.

Although FIGS. 4A-4B show example blocks of processes 400A and 400B, in some implementations, processes 400A and 400B may include additional blocks, fewer blocks, different blocks, or differently arranged blocks than those depicted in FIGS. 4A-4B. In embodiments, example blocks of process 400A may be combined in any order or amount with example blocks of process 400B. In embodiments, two or more of the blocks of processes 400A and 400B may be performed in parallel.

In embodiments, the release causes and procedures discussed above may be associated with elements included in various standards, for example mobile telecommunication standards associated with the 3rd Generation Partnership Project (3GPP). For example, in embodiments, the first release cause may be "S1AP_NAS_EMM: [017] Network failure", which may indicate a network failure to handle certain user equipment (UE) attach procedures or tracking update procedures, and may be reported using a pre-defined alarm. In embodiments, the first problematic procedure may be "S1AP: Attach", which may be a procedure in which subscribers' UE are trying to attach to a telecommunication network. In embodiments, the second problematic procedure may be "S1AP: Tracking Area Update", which may be a procedure in which subscribers' UE are attempting to attach to a telecommunication network and are telling the network its location, or the UE is already attached and has moved from some location to another different location. In embodiments, the second release cause may be "GTPv2: [073] No resources available", which may be a network failure to serve UEs' requests. In embodiments, the third release cause may be "S1AP: NAS_ESM: [031] request rejected unspecified", which may be a network rejection to serve UEs' requests without clear reason. In embodiments, the fourth release cause may be "S1AP: NAS: [3] Unspecified", which may be a network failure to serve UEs' requests without clear reason. In embodiments, the impacted network elements may be an "Evolved Node B (eNB) internet protocol (IP) address", "Tracking Area Code (TAC)", and a "destination Mobility Management Entity (MME) IP address". In embodiments, the problematic scenario may be identified as an "inconsistent TAC configuration" between an eNB and an MME or domain name server (DNS).

In embodiments, processes 400A and 400B may be modified to trigger based on different release causes, to identify and investigate any number of or any different problematic procedures and associated release causes, and to identify different root causes and impacted network elements.

In embodiments, the first release cause may be "DIAMETER [5003] AUTHORIZATION REJECTED", which may indicate that a request was received for which the user could not be authorized. In embodiments, the procedure identification module 104 may only identify one problematic procedure, which may be "User Authorization". In embodiments, the correlation module may only identify and investigate a second release cause and a third release cause, which may be "Subscriber Status–IE=OPERATOR_DETERMINED_BARRING", which may indicate that services of a subscriber that are barred by an operator, and "S1AP NAS_ESM: [031] Request rejected unspecified" which may indicate that a request is rejected for unspecified reasons. In embodiments, the impacted network elements may be a list of international mobile subscriber identity (IMSI) users. In embodiments, the problematic scenario may be identified as a base station subsystem (BSS) which administratively suspended the list of IMSI users.

Along with the troubleshooting results, a system implementing network management and troubleshooting process 100 may generate, transmit, or display sample signaling traces, for example a packet capture (PCAP) file of a degraded scenario, for example the problematic scenario identified by processes 400A-400B.

Figure 5:
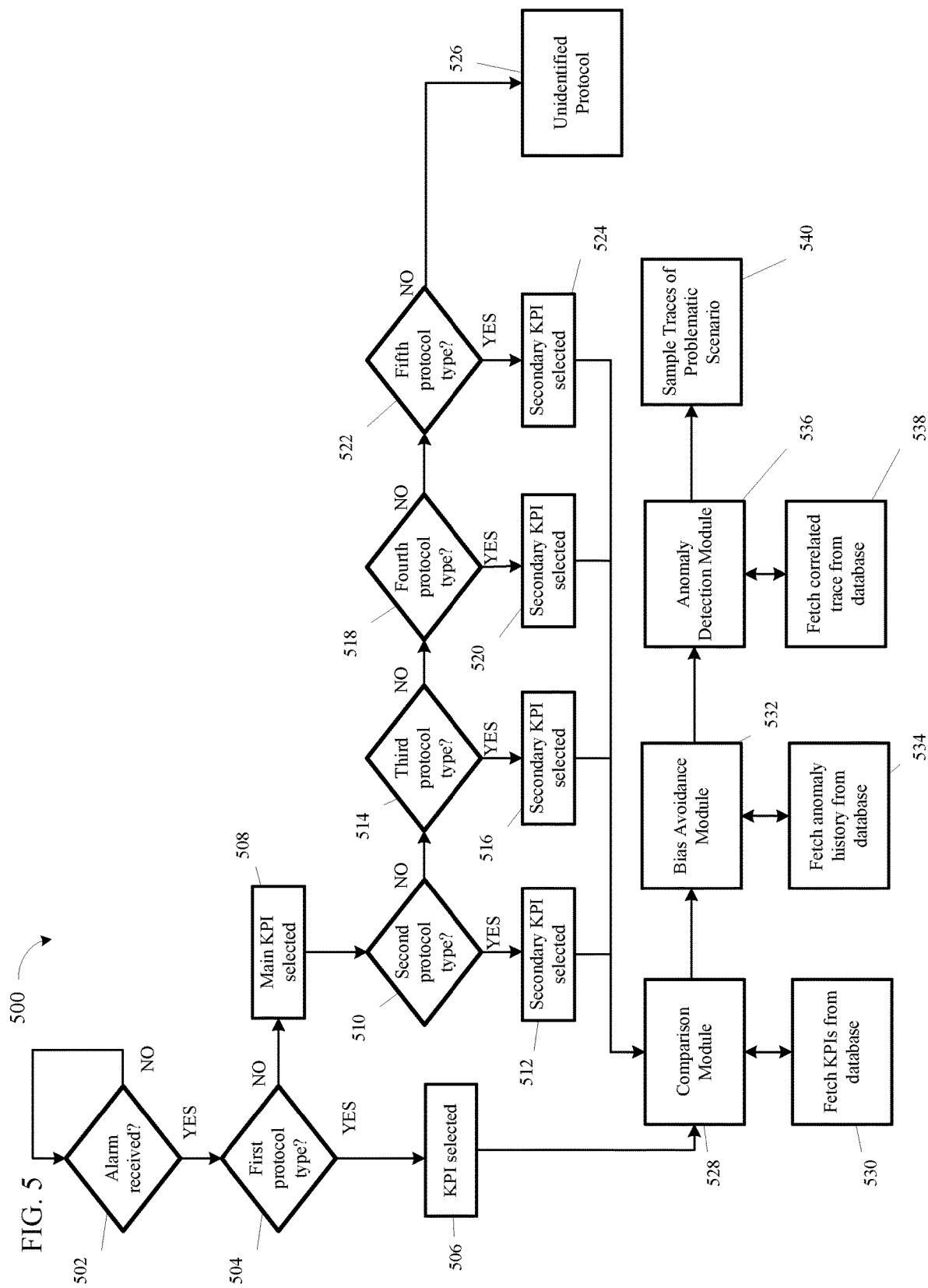
FIG. 5 is a flow chart of an example process for network management and troubleshooting, according to embodiments.

FIG. 5 is a flow chart of an example process 500 for generating a sample signaling trace corresponding to a problematic scenario. The signaling trace may include or correspond to various protocols and KPIs, for example as specified in various standards such as 3GPP telecommunications standards.

As illustrated in FIG. 5, one or more process blocks of process 500 may be performed by any of the elements of FIGS. 1-3 discussed above. As illustrated in FIG. 5, one or more process blocks of process 500 may correspond to network management and troubleshooting process 100. In embodiments, one or more process blocks of process 500 may be performed by or using elements illustrated in FIG. 1, for example any or one or more of degradation trigger module 102, procedure identification module 104, correlation module 106, matching module 108, or new anomaly identification module 110. In some implementations, one or more process blocks of process 500 may be performed by or using elements illustrated in FIGS. 2-3, for example any one or more of user device 210, platform 220, computing resource 224, or components of device 300.

As shown in FIG. 5, process 500 may include receiving an alarm at operation 502. In embodiments, the alarm may correspond to the degradation trigger discussed above.

As further shown in FIG. 5, process 500 may include determining whether the alarm is associated with a first protocol type. In embodiments, the first protocol type may be for example a MAP protocol type.

As further shown in FIG. 5, if the alarm is associated with a first protocol type (YES at operation 504), process 500 may include selecting a KPI at operation 506. In embodiments, the KPI may include one or more of TCAP error session codes, SCCP Called SSN, Procedures, SCCP Calling SSN, or MCC_MNC. If the alarm is not associated with the first protocol type (NO at operation 504), process 500 may include selecting a main KPI at operation 508, and proceeding to operation 510. In embodiments, the main KPI may include one or more of Source IP address, Destination IP address, or Procedure Type.

As further shown in FIG. 5, process 500 may include determining whether the alarm is associated with a second protocol type at operation 510. In embodiments, the second protocol type may be for example an S1AP protocol type. If the alarm is associated with the second protocol type (YES at operation 510), process 500 may include selecting a secondary KPI associated with the second protocol type at operation 512. In embodiments, the secondary KPI may include CGI. If the alarm is not associated with the second protocol type (NO at operation 510), process 500 may proceed to operation 514.

As further shown in FIG. 5, process 500 may include determining whether the alarm is associated with a third protocol type at operation 514. In embodiments, the third protocol type may be for example a GTPv2 protocol type. If the alarm is associated with the second protocol type (YES at operation 514), process 500 may include selecting a secondary KPI associated with the third protocol type at operation 516. In embodiments, the secondary KPI may include one or more of CGI, GTP Interface Type, and UE Model and Manufacturer. If the alarm is not associated with the third protocol type (NO at operation 514), process 500 may proceed to operation 518.

As further shown in FIG. 5, process 500 may include determining whether the alarm is associated with a fourth protocol type at operation 518. In embodiments, the first protocol type may be for example a SIP protocol type. If the alarm is associated with the fourth protocol type (YES at operation 518), process 500 may include selecting a secondary KPI associated with the fourth protocol type at operation 520. In embodiments, the secondary KPI may include one or more of CGI, SIP Reason, Media Type, and Media Format. If the alarm is not associated with the fourth protocol type (NO at operation 518), process 500 may proceed to operation 522.

As further shown in FIG. 5, process 500 may include determining whether the alarm is associated with a fifth protocol type at operation 522. In embodiments, the first protocol type may be for example a Diameter protocol type. If the alarm is associated with the fifth protocol type (YES at operation 522), process 500 may include selecting a secondary KPI associated with the fifth protocol type at operation 524. In embodiments, the secondary KPI may include Roaming Direction. If the alarm is not associated with the fifth protocol type (NO at operation 522), process 500 may proceed to operation 526.

As further shown in FIG. 5, at operation 526 process 500 may include determining that an unidentified protocol has been encountered, and ending process 500.

After the KPI, or the main KPI and secondary KPIs, are selected, process 500 may provide information indicating the selected KPIs to a comparison module at operation 528, which may obtain the selected KPIs from a database at operation 530. Then the obtained KPIs and any other desired information may be provided to bias avoidance module 532, which may fetch anomaly history from a database at operation 534. The obtained KPIs, anomaly history, and any other desired information may be sent to anomaly detection module 536, which may fetch one or more correlated traces from a database at operation 538. Then, process 500 may include generating sample traces of a problematic scenario associated with the alarm based on the information discussed above at operation 540.

Also, the protocols and KPIs are not fixed, and process 500 may be modified by addition and/or deletion of protocols, for example addition of an SGsAP protocol type, or KPIs as desired.

Figure 6B:
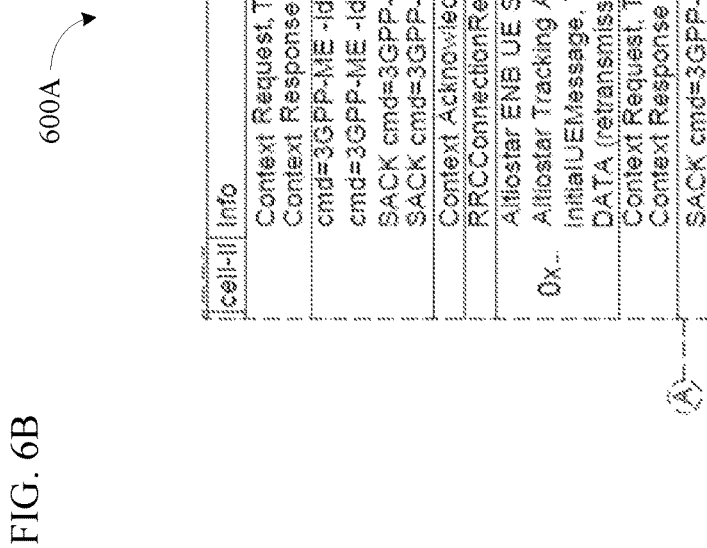

FIGS. 6A-6B illustrate is a diagram of an example user interface 600A displaying a result of network management and troubleshooting process 100, according to embodiments. For example, FIG. 6A may show a left-hand side of user interface 600A, and FIG. 6B may show a right-hand side of user interface 600A, and the two sides may be joined at the line marked A. In embodiments, the user interface screen shown in FIGS. 6A-6B may provide information about a problematic scenario, for example a root cause of a detected degradation.

Figure 7:
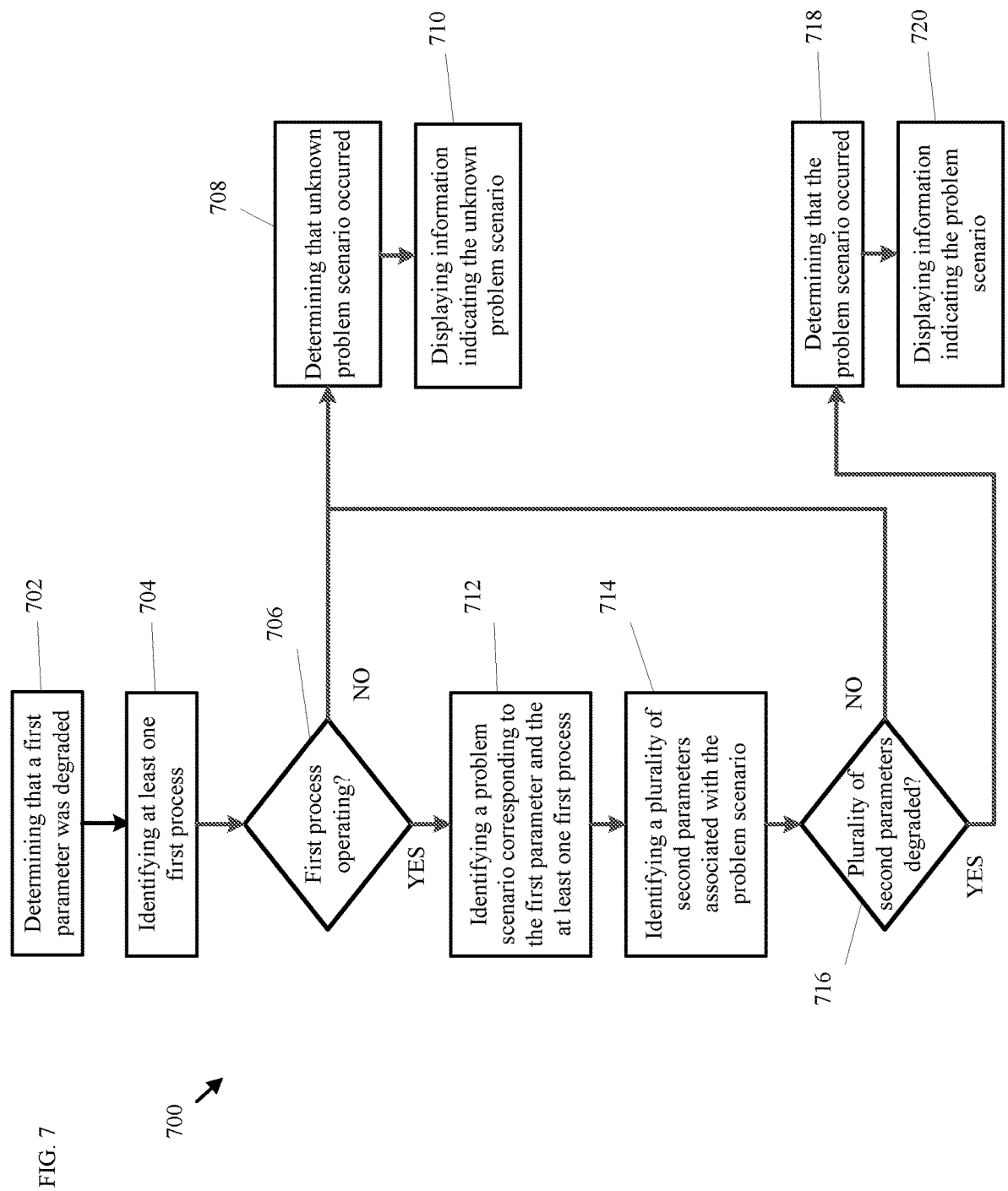
FIG. 7 is a flow chart of an example process for network management and troubleshooting, according to embodiments.

As illustrated in FIG. 7, one or more process blocks of process 700 may be performed by any of the elements of FIGS. 1-3 discussed above. As illustrated in FIG. 7, one or more process blocks of process 700 may correspond to network management and troubleshooting process 100. In embodiments, one or more process blocks of process 700 may be performed by or using elements illustrated in FIG. 1, for example any or one or more of degradation trigger module 102, procedure identification module 104, correlation module 106, matching module 108, or new anomaly identification module 110. In some implementations, one or more process blocks of process 700 may be performed by or using elements illustrated in FIGS. 2-3, for example any one or more of user device 210, platform 220, computing resource 224, or components of device 300. In embodiments, any one or more of process blocks of process 700 may include or be included in, or be combined in any manner with one or more process blocks of processes 400A-400B and 500 discussed above.

As shown in FIG. 7, process 700 may include determining that a first parameter was degraded at operation 702. In embodiments, the first parameter may being degraded may correspond to the degradation trigger or the first release cause discussed above.

As further shown in FIG. 7, process 700 may include identifying at least one first process corresponding to the first parameter at operation 704. In embodiments, the at least one first process may correspond to the problematic procedures such as the first procedure and the second procedure discussed above.

As further shown in FIG. 7, process 700 may include determining whether the at least one first process was operating while the first parameter was degraded at operation 706.

As further shown in FIG. 7, process 700 may include, based on determining that the at least one first process was operating while the first parameter was degraded (NO at operation 706) determining that an unknown problem scenario has occurred at operation 708, and displaying information indicating the unknown scenario at operation 710.

As further shown in FIG. 7, process 700 may include, based on determining that the at least one first process was operating while the first parameter was degraded (YES at operation 706), identifying a problem scenario corresponding to the first parameter and the at least one first process at operation 712.

As further shown in FIG. 7, process 700 may include identifying a plurality of second parameters associated with the problem scenario at operation 714.

As further shown in FIG. 7, process 700 may include determining whether the plurality of second parameters were degraded at operation 716. In embodiments, the plurality of second parameters may correspond to the other potential issues or the other release causes such as the second, third, and fourth release cause discussed above.

As further shown in FIG. 7, process 700 may include, based on determining that the plurality of second parameters were not degraded (NO at operation 716) determining that an unknown problem scenario has occurred at operation 708, and displaying information indicating the unknown scenario at operation 710.

As further shown in FIG. 7, process 700 may include, based on determining that the plurality of second parameters were degraded (YES at operation 706), determining that the problem scenario occurred at operation 718, and displaying information indicating the problem scenario at operation 720. In embodiments, the problem scenario may correspond to the problematic scenario discussed above.

In embodiments, process 700 may further include, based on determining that the unknown problem scenario occurred, identifying at least one second process that was operating while the first parameter was degraded; identifying at least one third parameter that was degraded while the first parameter was degraded; and storing information identifying a new problem scenario associated with the first parameter, the at least one second process, and the at least one third parameter.

In embodiments, process 700 may further include, based on determining that at least one second parameter of the plurality of second parameters was not degraded, determining that an unknown problem scenario occurred; and based on determining that the unknown problem scenario is present, displaying information indicating that the first parameter was degraded, that the at least one first process was operating while the first parameter was degraded, and that the at least one second parameter was not degraded.

In embodiments, process 700 may further include, based on determining that the unknown problem scenario occurred, identifying at least one third parameter that was degraded while the first parameter was degraded; and storing information identifying a new problem scenario associated with the first parameter, the at least one first process, and the at least one third parameter.

In embodiments, the problem scenario may relate to a network malfunction of a network.

In embodiments, the first parameter may relate to at least one from among a network alarm, a node alarm, a link alarm, or key performance indicator associated with the network.

In embodiments, the information indicating the problem scenario may include information identifying the network malfunction and a sample signaling trace captured based on the network malfunction.

In embodiments, the sample signaling trace may indicate a plurality of key performance indicators corresponding to the network malfunction.

Although FIG. 7 shows example blocks of process 700, in some implementations, processes 700 may include additional blocks, fewer blocks, different blocks, or differently arranged blocks than those depicted in FIG. 7. In embodiments, one or more blocks of example blocks of process 700 may be combined or arranged in any order or amount. In embodiments, two or more of the blocks of processes 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of automatic troubleshooting, the method being performed by at least one processor and comprising:
    analyzing, by the at least one processor, a first parameter of a network;
    determining that the first parameter was degraded, wherein the degrading of the first parameter relates to at least one from among a network alarm, a node alarm, a link alarm, or key performance indicator associated with the network;
    based on the determining that the first parameter was degraded, identifying, by the at least one processor, at least one first process corresponding to the first parameter;
    based on the identifying of the at least one first process, determining, by the at least one processor, whether the at least one first process was operating while the first parameter was degraded;
    based on determining that the at least one first process was operating while the first parameter was degraded, identifying, by the at least one processor, a potential problem scenario corresponding to the first parameter and the at least one first process from among a plurality of potential problem scenarios;
    based on the identifying of the potential problem scenario, identifying, by the at least one processor, a plurality of second parameters associated with the potential problem scenario;
    based on the identifying of the plurality of second parameters, determining, by the at least one processor, whether the plurality of second parameters were degraded;
    based on determining that the plurality of second parameters were degraded, confirming, by the at least one processor, that the potential problem scenario is an actual problem scenario which caused the first parameter to be degraded; and
    based on determining that the potential problem scenario is the actual problem scenario, displaying information indicating the actual problem scenario.

2. The method of claim 1, further comprising:
    based on determining that the at least one first process was not operating while the first parameter was degraded, determining that an unknown problem scenario occurred; and
    based on determining that the unknown problem scenario occurred, displaying information indicating that the first parameter was degraded and that the at least one first process was not operating while the first parameter was degraded.

3. The method of claim 2, further comprising:
    based on determining that the unknown problem scenario occurred, identifying at least one second process that was operating while the first parameter was degraded;
    identifying at least one third parameter that was degraded while the first parameter was degraded; and
    storing information identifying a new problem scenario associated with the first parameter, the at least one second process, and the at least one third parameter.

4. The method of claim 1, further comprising:
    based on determining that at least one second parameter of the plurality of second parameters was not degraded, determining that an unknown problem scenario occurred; and
    based on determining that the unknown problem scenario is present, displaying information indicating that the first parameter was degraded, that the at least one first process was operating while the first parameter was degraded, and that the at least one second parameter was not degraded.

5. The method of claim 4, further comprising:
    based on determining that the unknown problem scenario occurred, identifying at least one third parameter that was degraded while the first parameter was degraded; and
    storing information identifying a new problem scenario associated with the first parameter, the at least one first process, and the at least one third parameter.

6. The method of claim 1, wherein the potential problem scenario relates to a network malfunction of a network.

7. The method of claim 6, wherein the information indicating the actual problem scenario comprises information identifying the network malfunction and a sample signaling trace captured based on the network malfunction.

8. The method of claim 7, wherein the sample signaling trace indicates a plurality of key performance indicators corresponding to the network malfunction.

9. The method of claim 1, further comprising:
    based on the confirming that the potential problem scenario is the actual problem scenario, refining, by the at least one processor, the stored plurality of potential problem scenarios based on information about at least one from among the first parameter, the at least one first process, and the plurality of second parameters.

10. A device for automatic troubleshooting, the device comprising:
a memory configured to store instructions; and
one or more processors configured to execute the instructions to:
analyze a first parameter of a network;
determine that the first parameter was degraded, wherein the degrading of the first parameter relates to at least one from among a network alarm, a node alarm, a link alarm, or key performance indicator associated with the network;
based on the determining that the first parameter was degraded, identify at least one first process corresponding to the first parameter;
based on the identifying of the at least one first process, determine whether the at least one first process was operating while the first parameter was degraded;
based on determining that the at least one first process was operating while the first parameter was degraded, identify a potential problem scenario corresponding to the first parameter and the at least one first process from among a plurality of potential problem scenarios;
based on the identifying of the potential problem scenario, identify a plurality of second parameters associated with the potential problem scenario;
based on the identifying of the plurality of second parameters, determine whether the plurality of second parameters were degraded;
based on determining that the plurality of second parameters were degraded, confirming that the potential problem scenario is an actual problem scenario which caused the first parameter to be degraded; and
based on determining that the potential problem scenario is the actual problem scenario, display information indicating the actual problem scenario.

11. The device of claim 10, wherein the one or more processors are further configured to execute the instructions to:
based on determining that the at least one first process was not operating while the first parameter was degraded, determine that an unknown problem scenario occurred; and
based on determining that the unknown problem scenario occurred, display information indicating that the first parameter was degraded and that the at least one first process was not operating while the first parameter was degraded.

12. The device of claim 11, wherein the one or more processors are further configured to execute the instructions to:
based on determining that the unknown problem scenario occurred, identify at least one second process that was operating while the first parameter was degraded;
identify at least one third parameter that was degraded while the first parameter was degraded; and
store information identifying a new problem scenario associated with the first parameter, the at least one second process, and the at least one third parameter.

13. The device of claim 10, wherein the one or more processors are further configured to execute the instructions to:
based on determining that at least one second parameter of the plurality of second parameters was not degraded, determine that an unknown problem scenario occurred; and based on determining that the unknown problem scenario is present, display information indicating that the first parameter was degraded, that the at least one first process was operating while the first parameter was degraded, and that the at least one second parameter was not degraded.

14. The device of claim 13, wherein the one or more processors are further configured to execute the instructions to:
based on determining that the unknown problem scenario occurred, identify at least one third parameter that was degraded while the first parameter was degraded; and
store information identifying a new problem scenario associated with the first parameter, the at least one first process, and the at least one third parameter.

15. The device of claim 10, wherein the potential problem scenario relates to a network malfunction of a network.

16. The device of claim 15, wherein the information indicating the actual problem scenario comprises information identifying the network malfunction and a sample signaling trace captured based on the network malfunction.

17. The device of claim 16, wherein the sample signaling trace indicates a plurality of key performance indicators corresponding to the network malfunction.

18. A non-transitory computer-readable medium storing instructions, the instructions comprising: one or more instructions that, when executed by one or more processors of a device for automatic troubleshooting, cause the one or more processors to:
analyze a first parameter of a network;
determine that the first parameter was degraded, wherein the degrading of the first parameter relates to at least one from among a network alarm, a node alarm, a link alarm, or key performance indicator associated with the network;
based on the determining that the first parameter was degraded, identify at least one first process corresponding to the first parameter;
based on the identifying of the at least one first process, determine whether the at least one first process was operating while the first parameter was degraded;
based on determining that the at least one first process was operating while the first parameter was degraded, identify a problem scenario corresponding to the first parameter and the at least one first process from among a plurality of potential problem scenarios;
based on the identifying of the potential problem scenario, identify a plurality of second parameters associated with the potential problem scenario;
based on the identifying of the plurality of second parameters, determine whether the plurality of second parameters were degraded;
based on determining that the plurality of second parameters were degraded, confirming that the potential problem scenario is an actual problem scenario which caused the first parameter to be degraded; and
based on determining that the potential problem scenario is the actual problem scenario, display information indicating the actual problem scenario.

19. The non-transitory computer-readable medium of claim 18, wherein the problem scenario relates to a network malfunction of a network.

* * * * *